United States Patent
Suzuki

(10) Patent No.: US 9,934,656 B2
(45) Date of Patent: Apr. 3, 2018

(54) CHECKOUT SYSTEM, SETTLEMENT APPARATUS AND METHOD FOR EXECUTING SETTLEMENT PROCESSING

(71) Applicant: TOSHIBA TEC KABUSHIKI KAISHA, Tokyo (JP)

(72) Inventor: Toshiyuki Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/412,783

(22) Filed: Jan. 23, 2017

(65) Prior Publication Data

US 2017/0221317 A1    Aug. 3, 2017

(30) Foreign Application Priority Data

Jan. 29, 2016   (JP) ................. 2016-015822

(51) Int. Cl.
*G06Q 20/20* (2012.01)
*G07G 1/00* (2006.01)

(52) U.S. Cl.
CPC ......... *G07G 1/0072* (2013.01); *G06Q 20/202* (2013.01); *G06Q 20/208* (2013.01); *G07G 1/0045* (2013.01)

(58) Field of Classification Search
CPC .................................. G06Q 20/202
USPC ...................................... 235/383
See application file for complete search history.

(56) References Cited

U.S. PATENT DOCUMENTS

| 2015/0332242 A1* | 11/2015 | Perry | G06Q 20/206 705/18 |
| 2016/0203680 A1* | 7/2016 | Sambe | G06Q 20/3276 235/383 |
| 2017/0061405 A1* | 3/2017 | Bryant | G06Q 20/4014 |

FOREIGN PATENT DOCUMENTS

JP       2013-242839       12/2013

* cited by examiner

*Primary Examiner* — Toan Ly
(74) *Attorney, Agent, or Firm* — Patterson & Sheridan, LLP

(57) ABSTRACT

A checkout system includes a plurality of settlement apparatuses and a registration apparatus. The registration apparatus includes a scanner, a storage unit, a communication interface, and a processor. The processor controls the scanner, the storage unit and the communication interface to identify a commodity corresponding to a scanned code, generate the settlement information, and transmit the settlement information to a selected one of the plurality of settlement apparatuses. The selected one of the plurality of settlement apparatuses determines, with respect to itself, whether a settlement processing is currently being performed and whether a settlement processing was completed within a preceding predetermined amount of time. Based on the determination, the selected one of the plurality of settlement apparatuses performs one of the settlement processing with respect to the received settlement information and transmission of the settlement information to another one of the plurality of settlement apparatuses.

20 Claims, 8 Drawing Sheets

FIG.1
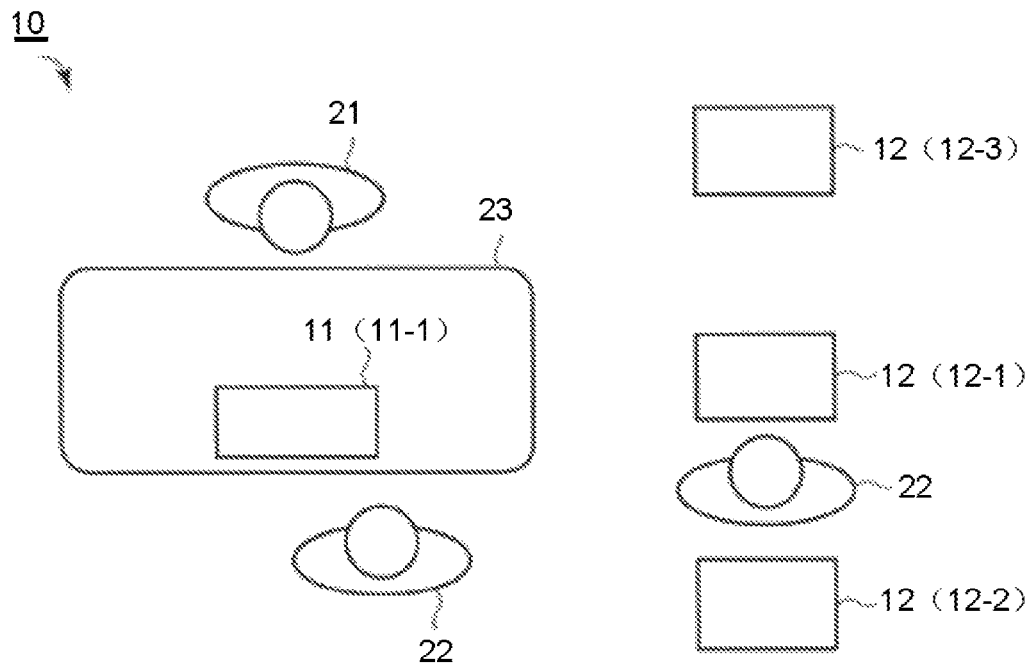
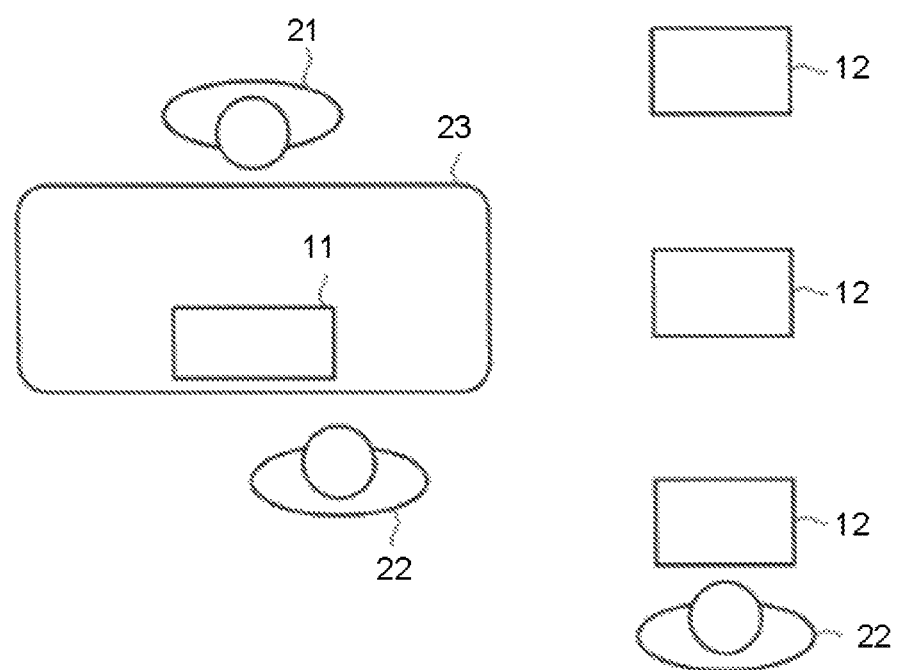

CHECKOUT SYSTEM, SETTLEMENT APPARATUS AND METHOD FOR EXECUTING SETTLEMENT PROCESSING

CROSS-REFERENCE TO RELATED APPLICATION

This application is based upon and claims the benefit of priority from Japanese Patent Application No. 2016-015822, filed Jan. 29, 2016, the entire contents of which are incorporated herein by reference.

FIELD

Embodiments described herein relate generally to a checkout system, a settlement apparatus and a method for executing a settlement processing by the settlement apparatus.

BACKGROUND

In some checkout systems of retail stores, an input processing apparatus for inputting commodity data and a settlement apparatus for settling a transaction are separated. The input processing apparatus waits for input of data relating to a commodity. If the data is input by an operator, the input processing apparatus generates settlement information based on the data and sends the settlement information to the settlement apparatus. The settlement apparatus waits for input of payment data for the settlement information. If the payment data is input by the operator, the settlement apparatus processes settlement on the basis of the settlement information and the payment data. Such a checkout system in which the input processing apparatus and the settlement apparatus are separated can adopt a so-called semi-self-service system in which a store clerk operates the input processing apparatus and a customer operates the settlement apparatus. In this kind of checkout system, there is a possibility of causing confusion to the customer who carries out the settlement if new settlement information is received by the settlement apparatus which is already executing the settlement processing. Therefore, the settlement apparatus receives new settlement information only in a case in which the settlement processing is not executed.

However, even if the settlement processing for one transaction is completed, it is not always true that a customer, i.e., a person that has settled the transaction, leaves the settlement apparatus quickly. Then, there is still a possibility of causing confusion to the customer if the new settlement information is received by the settlement apparatus that is kept in a state in which the customer who finishes the settlement still stands in front of the apparatus and the settlement apparatus is capable of starting the settlement processing for another customer.

DESCRIPTION OF THE DRAWINGS

FIG. 1 is a schematic diagram illustrating a checkout system according to a first embodiment;

DETAILED DESCRIPTION

Figure 2:
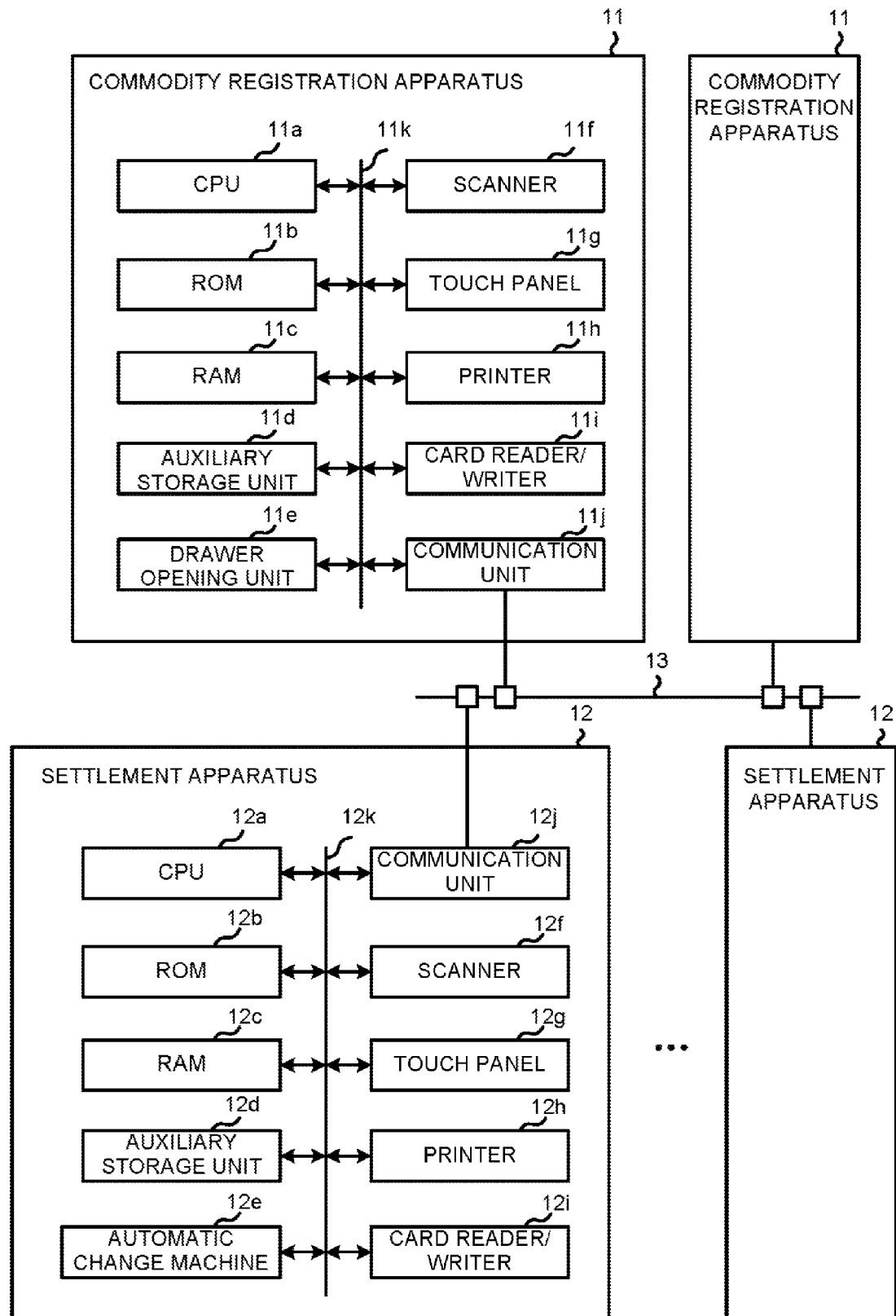
FIG. 2 is a block diagram illustrating main portions of a commodity registration apparatus and a settlement apparatus.

A checkout system according to an embodiment includes a plurality of settlement apparatuses and a registration apparatus. The registration apparatus includes a scanner, a storage unit, a communication interface, and a processor. The processor controls the scanner, the storage unit and the communication interface to identify a commodity corresponding to a scanned code, generate the settlement information, and transmit the settlement information to a selected one of the plurality of settlement apparatuses. The selected one of the plurality of settlement apparatuses determines, with respect to itself, whether a settlement processing is currently being performed and whether a settlement processing was completed within a preceding predetermined amount of time. Based on the determination, the selected one of the plurality of settlement apparatuses performs one of the settlement processing with respect to the received settlement information and transmission of the settlement information to another one of the plurality of settlement apparatuses.

Hereinafter, embodiments of a checkout system of a semi-self-service system installed in a store such as a retail store are described with reference to the accompanying drawings.

First Embodiment

FIG. 1 is a schematic diagram illustrating a checkout system 10 according to the first embodiment. The checkout system 10 includes a plurality of commodity registration apparatuses 11 and settlement apparatuses 12 of which the number is more than that of the commodity registration apparatuses 11. The commodity registration apparatus 11 and the settlement apparatus 12 are arranged for each checkout lane of the store.

In FIG. 1, a case in which two commodity registration apparatuses 11 and six settlement apparatuses 12 are arranged in two checkout lanes is illustrated. In FIG. 1, one commodity registration apparatus 11 and three settlement apparatuses 12 are provided for one checkout lane. The number of the commodity registration apparatuses 11 and the number of the settlement apparatuses 12 included in the checkout system 10 are not limited. Further, a ratio of the number of the commodity registration apparatuses 11 to the number of the settlement apparatuses 12 provided in one checkout lane is not also limited, and this ratio may be different for different checkout lanes.

A store clerk 21 serving as a checker is an operator of the commodity registration apparatus 11. A customer 22 who purchases a commodity sold in the store is an operator of the settlement apparatus 12. There is also a case in which the settlement apparatus 12 is operated by the store clerk 21.

The commodity registration apparatus 11 is mounted on a working table 23 in FIG. 1. The working table 23 has a rectangular top plate. Passages for the customers 22 are formed by arranging a plurality of the working tables 23 in such a manner that the longitudinal directions of the top plates are almost parallel. The passage is the foregoing checkout lane.

The commodity registration apparatus 11 performs functions including a registration processing of a purchased commodity, generation of settlement information and sending the settlement information to the settlement apparatus 12. The registration processing registers a commodity as a purchased commodity provided by the customer 22 who enters the passage. The settlement information is necessary for settlement processing. The commodity registration apparatus 11 perform the function of the settlement processing. The settlement processing includes settling the transaction on the basis of the settlement information.

The settlement apparatus 12 performs the settlement processing based on the settlement information when the settlement information is received from the commodity registration apparatus 11.

FIG. 2 is a block diagram illustrating main portions of the commodity registration apparatus 11 and the settlement apparatus 12. The commodity registration apparatus 11 and the settlement apparatus 12 both are connected with a LAN (Local Area Network) 13 serving as a network. The network can also use another communication network such as an Internet or a wireless LAN instead of the LAN 13. Furthermore, information may be transmitted and received between the commodity registration apparatus 11 and the settlement apparatus 12 via a server.

The commodity registration apparatus 11 includes a CPU (Central Processing Unit) 11a, a ROM (Read-only Memory) 11b, a RAM (Random-access Memory) 11c, an auxiliary storage unit 11d, a drawer opening unit 11e, a scanner 11f, a touch panel 11g, a printer 11h, a card reader/writer 11i, a communication unit 11j and a transmission system 11k.

The CPU 11a, the ROM 11b, the RAM 11c and the auxiliary storage unit 11d are connected by the transmission system 11k to constitute a computer.

The CPU 11a acts as the main unit of the computer. The CPU 11a controls each section for realizing various functions of the commodity registration apparatus 11 according to an operating system, middleware and an application program stored in the ROM 11b and the RAM 11c.

The ROM 11b is a main storage unit of the computer. The ROM 11b stores the operating system. As occasion demands, the ROM 11b stores the middleware and the application program. Further, as occasion demands, the ROM 11b also stores data required to execute various processing by the CPU 11a.

The RAM 11c is another main storage unit of the computer. As occasion demands, the RAM 11c stores data required to execute various processing by the CPU 11a. Furthermore, the RAM 11c is used as a so-called working area for storing data temporarily used when the CPU 11a executes various processing. Specifically, the RAM 11c stores a registration commodity table, a checkout table and a sending destination storage area.

The registration commodity table is capable of storing a plurality of records relating to a commodity registered as a purchased commodity. Each record includes a commodity code, a commodity name, a unit price, a quantity and an amount. The commodity code is a unique code for identifying the purchased commodity. The commodity code represented by, for example, a barcode is attached to each commodity. The commodity name and the unit price are the name and the price per unit of the purchased commodity specified by the commodity code of the corresponding record. The quantity and the amount are sales data of the purchased commodity specified by the commodity code of the corresponding record, that is, a sales quantity and a sales amount corresponding to the quantity.

The checkout system 10 is connected with a database server (not shown) via the LAN 13. In the database server, there is a commodity database for setting commodity information such as a commodity name, a unit price and the like in association with a commodity code of each commodity. In the commodity registration apparatus 11, if a commodity code is acquired, the CPU 11a inquires the database server of the commodity information with the commodity code. The database server which receives the inquiry accesses the commodity database to read out the commodity information associated with the commodity code, and to notify the commodity registration apparatus 11 of the commodity information via the LAN 13. The CPU 11a of the commodity registration apparatus 11 adds the records generated on the basis of the commodity information received from the database server to the registration commodity table.

The checkout table stores a total quantity and a total amount of the purchased commodities. The total quantity is a total of the quantities shown in all the records stored in the registration commodity table. The total amount is a total of the amounts shown in all the records stored in the registration commodity table.

The sending destination storage area stores a sending destination ID for specifying a settlement apparatus 12 serving as the sending destination of the settlement information. For example, an ID for identifying one predetermined settlement apparatus 12 from the plurality of (three in FIG. 1) settlement apparatuses 12 arranged in the same checkout lane is stored in the sending destination storage area as the sending destination ID.

The auxiliary storage unit 11d is an auxiliary storage section of the computer. The auxiliary storage unit 11d stores data used by the CPU 11a which carries out various processing, or data generated in the processing by the CPU 11a. As the auxiliary storage unit 11d, for example, an EEPROM (electric erasable programmable read-only memory), an HDD (hard disk drive), or SSD (solid state drive) can be used.

The application program stored in the ROM 11b or the auxiliary storage unit 11d includes a control program described with respect to a control processing described later. The installation of the commodity registration apparatus 11 is carried out in general in a state in which the control program is stored in the ROM 11b or the auxiliary storage unit 11d. However, in a state in which the control program is not stored in the ROM 11b or the auxiliary storage unit 11d, there is also a case in which the commodity registration apparatus 11 is transferred. In this case, the control program is recorded in a removable recording medium such as a magnetic disk, a magneto optical disk, an optical disk and a semiconductor memory to be transferred. Also, the control program may be transferred via the network, and this control program may be written into the auxiliary storage unit 11d of the commodity registration apparatus 11 which is separately transferred as described above.

The drawer opening unit 11e automatically opens a drawer to which banknotes and coins are received.

The scanner 11f reads the information of a commodity to obtain the commodity code of the commodity. As the scanner 11f, various well-known types of scanners can be used without modification. The scanner 11f may correspond to only one of various well-known types, or correspond to a plurality of types. In other words, the scanner 11f may include a fixed type or hand-held type two-dimensional code scanner. Further, as the scanner 11f, a type of scanner that adopts an image recognition technology to identify the commodity from the image of the commodity may be included.

The touch panel 11g includes a display device and a touch sensor. The display device displays various screens such as a GUI screen and the like. As the display device, for example, a well-known device such as a color LCD can be used. The touch sensor is arranged by being overlaid on the display surface of the display device. The touch sensor detects a touch position of the operator on the display surface of the display device and sends the position information to the CPU 11a. As the touch sensor, a well-known device can be used.

The printer 11h prints various character strings and images on a receipt paper to issue a receipt. As this kind of printer 11h, for example, a thermal printer or an impact dot printer can be used.

The card reader/writer 11i performs a function of reading data recorded in a card and a function of writing data into the card. The card may include a member card such as a membership card or a point card, in addition to a card for settlement such as a credit card, a debit card, an electronic money card, a pre-paid card and the like. The member card includes information for identifying a member. The card reader/writer 11i may be any one of a magnetic type device, a contact type device or a non-contact type device, or may include a plurality of types of devices.

The communication unit 11j performs data communication with the plurality of the settlement apparatuses 12 connected via the LAN 13. The communication unit 11j can also perform data communication with other commodity registration apparatuses 11 via the LAN 13.

The transmission system 11k transmits data transmitted or received among the CPU 11a, the ROM 11b, the RAM 11c, the auxiliary storage unit 11d, the drawer opening unit 11e, the scanner 11f, the touch panel 11g, the printer 11h, the card reader/writer 11i and the communication unit 11j. As the transmission system 11k, a well-known system which includes various buses such as a system bus and the like and various interface circuits for connecting these buses with each section can be used.

As hardware of such a commodity registration apparatus 11, a POS terminal corresponding to, for example, an existing face-to-face sales system can be used.

The settlement apparatus 12 includes a CPU 12a, a ROM 12b, a RAM 12c, an auxiliary storage unit 12d, an automatic change machine 12e, a scanner 12f, a touch panel 12g, a printer 12h, a card reader/writer 12i, a communication unit 12j and a transmission system 12k.

The CPU 12a, the ROM 12b, the RAM 12c and the auxiliary storage unit 12d are connected by the transmission system 12k and may be provided as a computer.

The CPU 12a acts as the main unit of the foregoing computer. The CPU 12a controls each section for realizing various functions as the settlement apparatus 12 according to an operating system, middleware and an application program stored in the ROM 12b and the RAM 12c.

The ROM 12b is a main storage part of the computer. The ROM 12b stores the operating system. As occasion demands, the ROM 12b stores the middleware and the application program. Further, as occasion demands, the ROM 12b also stores data required to execute various processing by the CPU 12a.

The RAM 12c is another main storage part of the computer. As occasion demands, the RAM 12c stores data required to execute various processing by the CPU 12a. The RAM 12c is used as a so-called working area for storing data temporarily used when the CPU 12a executes various processing. Specifically, the RAM 12c stores a settlement buffer, a processing flag, a transfer destination storage area and a return destination storage area.

The settlement buffer temporarily stores the settlement information received from the commodity registration apparatus 11.

The processing flag identifies whether or not the settlement processing based on the settlement information is being executed. In the present embodiment, the processing flag is set to "0" when the settlement processing is not being executed, and is set to "1" when the settlement processing is being executed.

The transfer destination storage area stores a transfer destination ID for specifying another settlement apparatus 12 serving as a transfer destination of the settlement information. For example, an ID for identifying another preset settlement apparatus 12 from a plurality of (three in FIG. 1) settlement apparatuses 12 arranged in the same checkout lane is stored in the transfer destination storage area as the transfer destination ID. In a case in which another settlement apparatus 12 serving as the transfer destination is not determined, the transfer destination ID is not stored in the transfer destination storage area. Otherwise, information indicating that the transfer destination ID is not set is stored.

The return destination storage area stores a communication address of a commodity registration apparatus 11 serving as a return destination of the settlement information. For example, an ID for identifying the commodity registration apparatus 11 arranged in the same checkout lane is stored in the return destination storage area as the return destination ID.

The auxiliary storage unit 12d is an auxiliary storage section of the computer. The auxiliary storage unit 12d stores data used by the CPU 12a which carries out various processing, or data generated in the processing by the CPU 12a. As the auxiliary storage unit 12d, for example, an EEPROM, an HDD, or SSD can be used.

The application program stored in the ROM 12b or the auxiliary storage unit 12d includes a control program described with respect to a control processing described later. The installation of the settlement apparatus 12 is carried out in general in a state in which the control program is stored in the ROM 12b or the auxiliary storage unit 12d. However, in a state in which the control program is not stored in the ROM 12b or the auxiliary storage unit 12d, there is also a case in which the settlement apparatus 12 is transferred. In this case, the control program is recorded in a removable recording medium such as a magnetic disk, a magneto optical disk, an optical disk and a semiconductor memory to be transferred. Otherwise, the control program is transferred via the network, and this control program may be written into the auxiliary storage unit 12d of the settlement apparatus 12 which is separately transferred above.

The automatic change machine 12e receives deposited coins and bills. Further, the automatic change machine 12e discharges coins and bills as change.

The scanner 12f reads the information of a commodity to obtain the commodity code of the commodity. As the scanner 12f, various well-known types of scanners can be used without any change. The scanner 12*f* may correspond to only one of various well-known types, or correspond to a plurality of types. In other words, the scanner 12*f* may include a fixed type or hand-held type two-dimensional code scanner. Further, as the scanner 12*f*, a type of scanner that adopts an image recognition technology to identify the commodity from the image of the commodity may be included.

The touch panel 12*g* includes a display device and a touch sensor. The display device displays various screens such as a GUI screen. As the display device, for example, a well-known device such as a color LCD can be used. The touch sensor is arranged by being overlaid on the display surface of the display device. The touch sensor detects a touch position of the operator on the display surface of the display device to send the position information to the CPU 12*a*. As the touch sensor, a well-known device can be used.

The printer 12*h* prints various character strings and images on a receipt paper to issue a receipt. As the printer 12*h*, for example, a thermal printer or an impact dot printer can be used.

The card reader/writer 12*i* performs a function of reading data recorded in a card and a function of writing data into the card. The card may include a member card referred to as a membership card or a point card, in addition to a card for settlement such as a credit card, a debit card, an electronic money card, a pre-paid card and the like. The member card records information for identifying a member. The card reader/writer 12*i* may be any one of a magnetic type device, a contact type device or a non-contact type device, or may include a plurality of types of devices.

The communication unit 12*j* performs out data communication with the plurality of the commodity registration apparatuses 11 connected via the LAN 13. The communication unit 12*j* can also perform the data communication with other settlement apparatuses 12 via the LAN 13.

The automatic change machine 12*e*, the card reader/writer 12*i*, and the

The transmission system 12*k* transmits data transmitted and received among the CPU 12*a*, the ROM 12*b*, the RAM 12*c*, the auxiliary storage unit 12*d*, the automatic change machine 12*e*, the scanner 12*f*, the touch panel 12*g*, the printer 12*h*, the card reader/writer 12*i* and the communication unit 12*j*. As the transmission system 12*k*, a well-known system which includes various buses such as a system bus and the like and various interface circuits for connecting these buses with each section can be used.

As hardware of such a settlement apparatus 12, a POS terminal corresponding to, for example, an existing self-system can be used.

Figure 3:
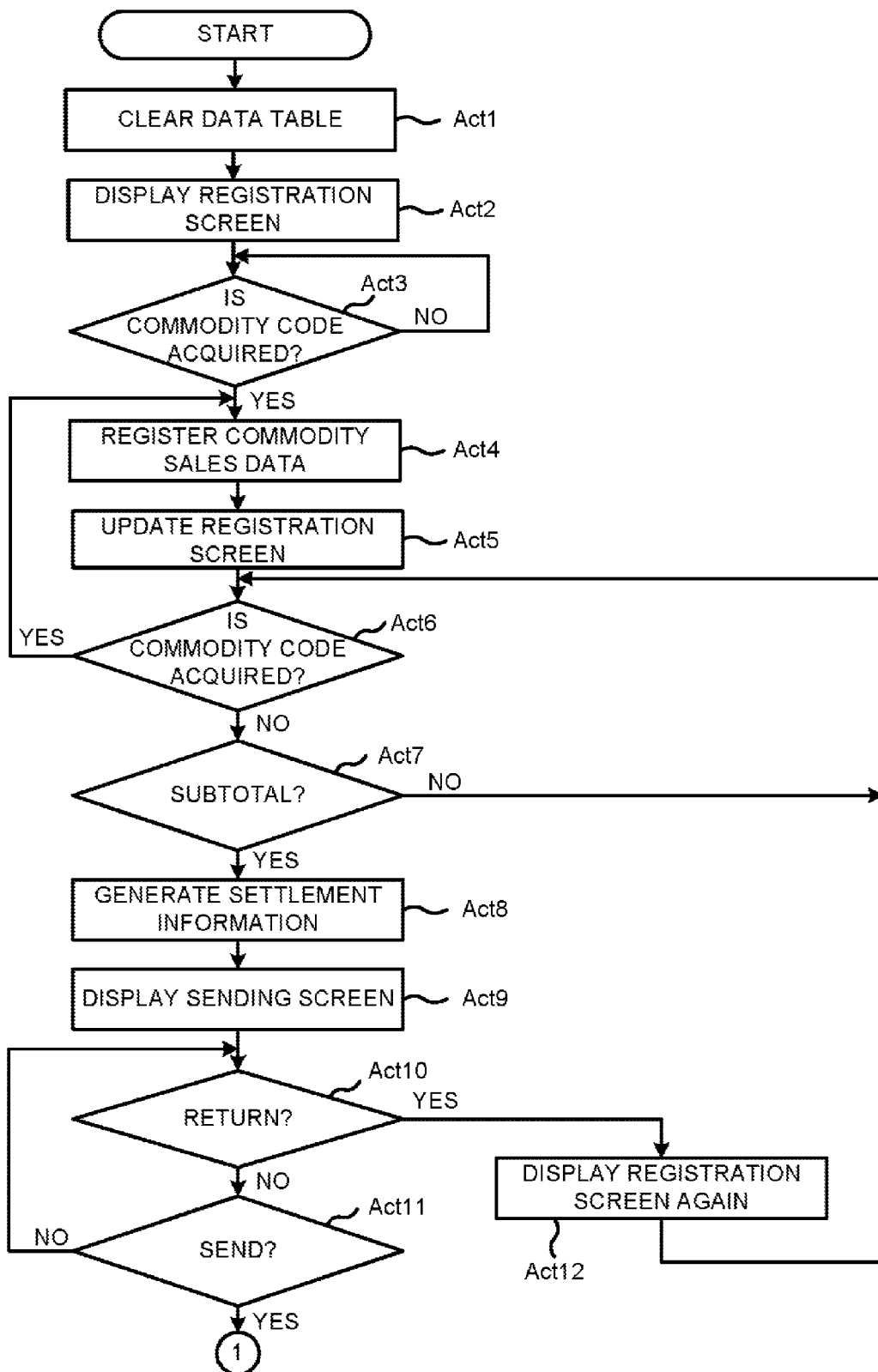
FIGS. 3 and 4 are flowcharts illustrating an example sequence of operations of a main processing executed by a CPU of the commodity registration apparatus according to a control program.
Figure 4:
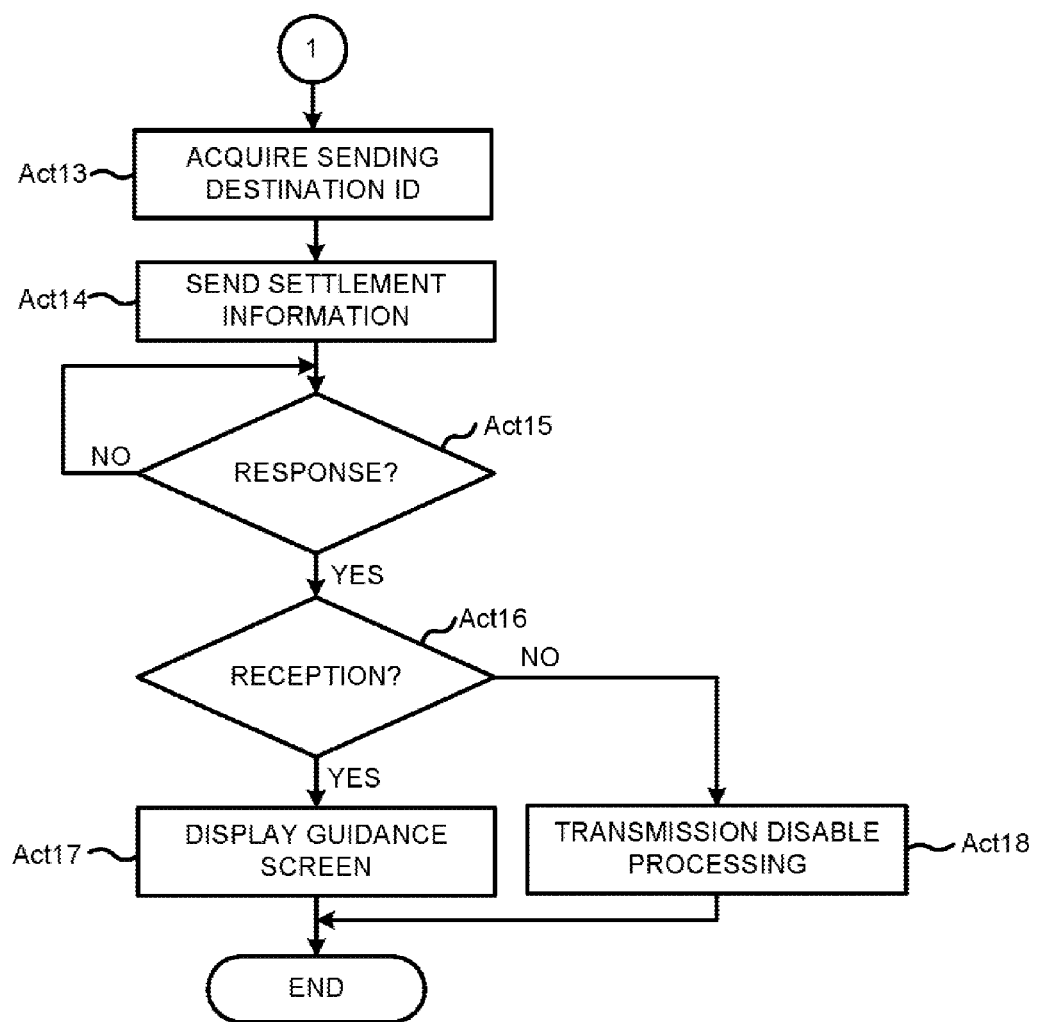
Figure 5:
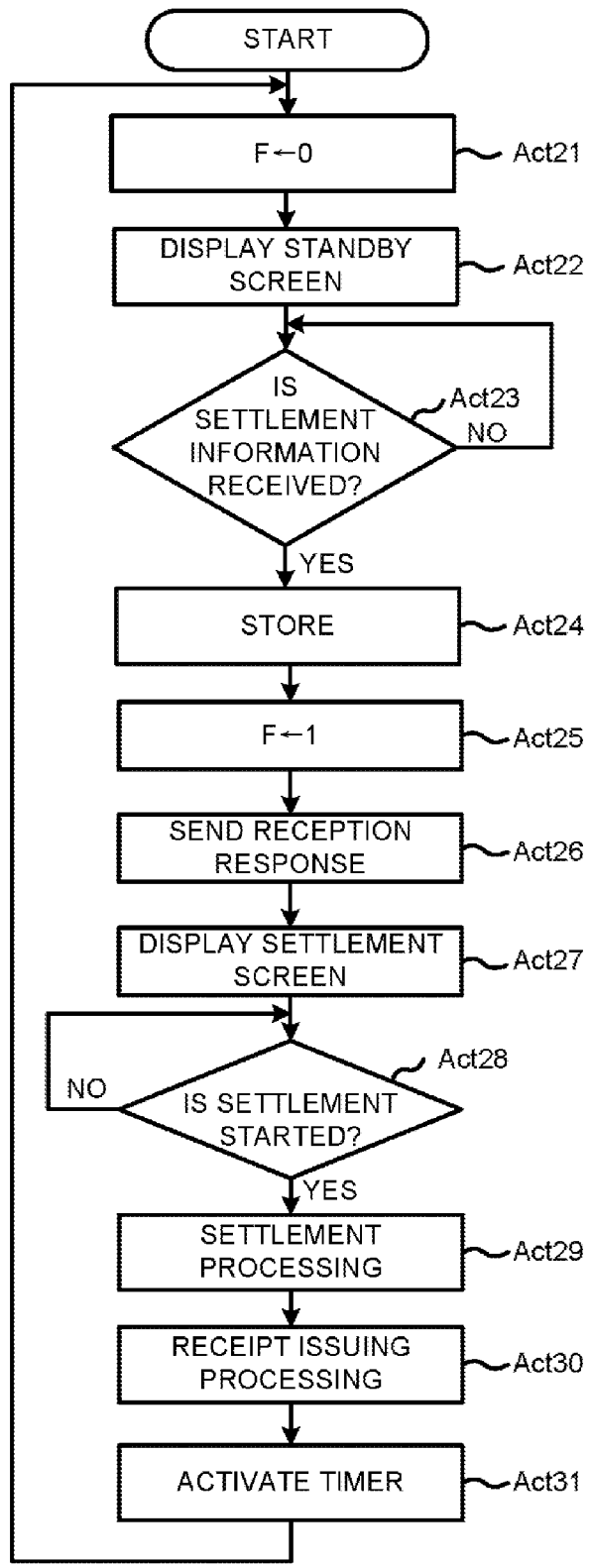
FIG. 5 is a flowchart illustrating an example sequence of operations of a main processing executed by a CPU of the settlement apparatus according to a control program.
Figure 6:
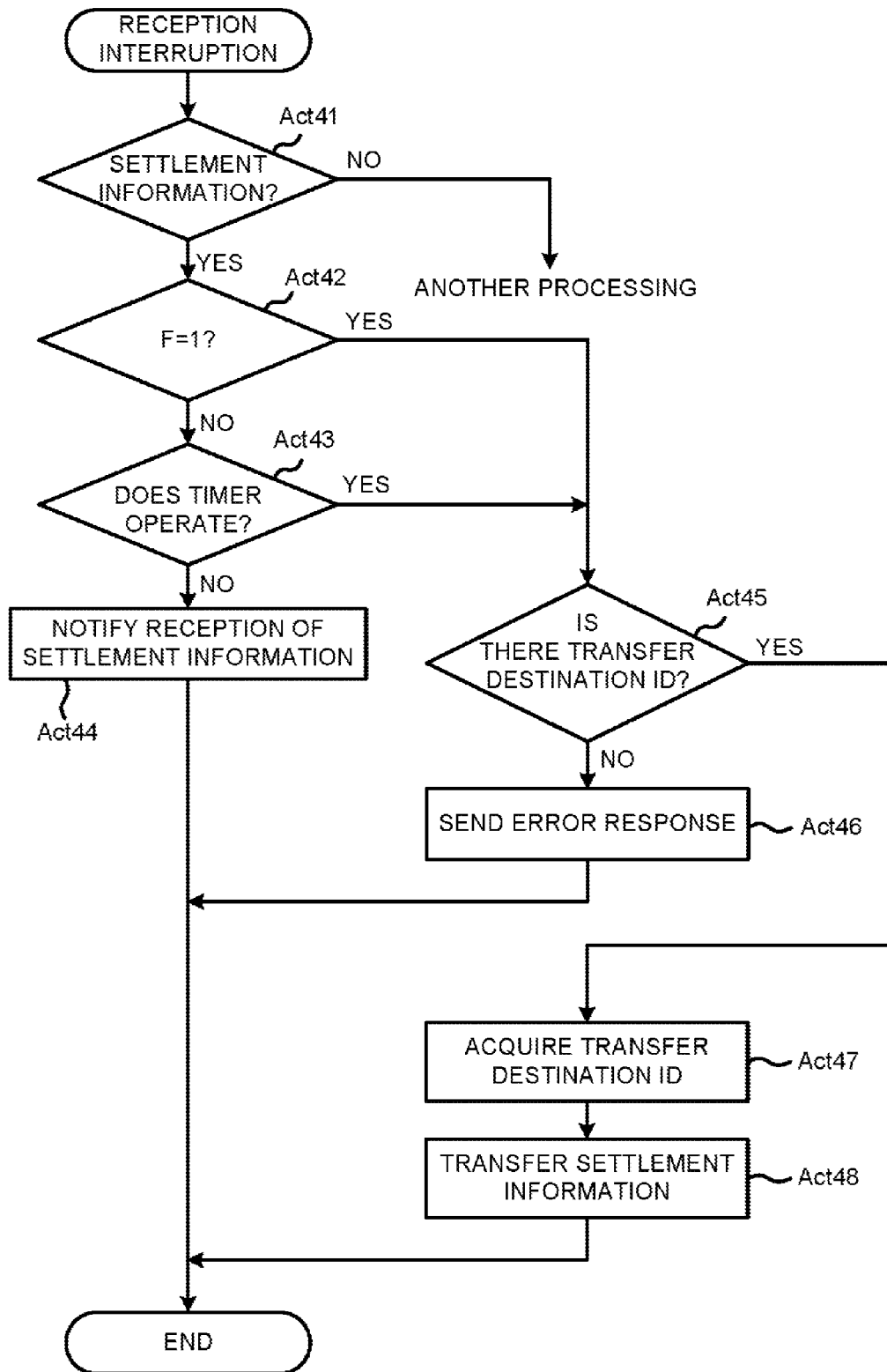
FIG. 6 is a flowchart illustrating an example sequence of operations of a reception interruption processing executed by the CPU of the settlement apparatus according to the control program.

FIG. 3 and FIG. 4 are flowcharts illustrating an example sequence of operations of a main processing executed by the CPU 11*a* of the commodity registration apparatus 11 according to the control program. FIG. 5 is a flowchart illustrating an example sequence of operations of a main processing executed by the CPU 12*a* of the settlement apparatus 12 according to the control program. FIG. 6 is a flowchart illustrating an example sequence of operations of a reception interruption processing executed by the same CPU 12*a* according to the same control program. Hereinafter, with reference to these figures, operations of the checkout system 10 are described. Furthermore, the contents of the processing described below are one example, and various processing capable of achieving the same result can be suitably used.

First, the operations of the commodity registration apparatus 11 are described.

If the commodity registration apparatus 11 is activated in a mode of carrying out the registration processing of the purchased commodity, the CPU 11*a* starts the control processing of the procedures shown in the flowchart in FIG. 3. First, the CPU 11*a* clears the registration commodity table and a total table (Act 1). Next, the CPU 11*a* displays a registration screen on a part of the screen of the touch panel 11*g* (Act 2).

The registration screen displays contents of the registration commodity table and the total table, to enable the store clerk 21 to confirm a status of the registration processing. The registration screen includes first and second display areas. The first display area displays the commodity name, the quantity and the unit price relating to a commodity for which purchase registration is carried out most recently, and the total quantity and the total amount of the purchased commodity after the commodity is registered. The second display area displays a list of the commodity name, the quantity, the unit price and the amount relating to a commodity for which the purchase registration is carried out prior to a commodity displayed on the registration screen.

The CPU 11*a* displays various function buttons such as a commodity button for the store clerk 21 to specify a commodity or a subtotal button outside the area of the registration screen on the screen of the touch panel 11*g*.

In a state in which the registration screen is displayed, the store clerk 21 operates, for example, the scanner 11*f* or the commodity button to sequentially input the commodity codes of the commodities purchased by the customer 22. Then, if the input of all the commodity codes of the purchased commodities is completed, the store clerk 21 touches the subtotal button.

The CPU 11*a* waits for the acquisition of the commodity code of the commodity to be sales-registered (Act 3). If the commodity code input via the scanner 11*f* or the commodity button is acquired (Yes in Act 3), the CPU 11*a* detects the commodity information such as the commodity name, the unit price and the like which is set in the commodity database in association with the commodity code. Further, the CPU 11*a* multiplies the sales quantity by the unit price to calculate the sales amount. Then, the CPU 11*a* sets the commodity sales data including the commodity code, the commodity name, the unit price, the sales quantity and the sales amount as one record, and registers the commodity sales data in the registration commodity table (Act 4). The CPU 11*a* adds the sales quantity and the sales amount to the total table. Then, the CPU 11*a* updates the registration screen in conformity with the contents of the registration commodity table and the total table (Act 5).

After updating the registration screen, the CPU 11*a* confirms whether or not the commodity code of the commodity to be sales-registered is acquired (Act 6). If the commodity code is not acquired (No in Act 6), the CPU 11*a* confirms whether or not the subtotal button is touched (Act 7). If the subtotal button is not touched (No in Act 7), the CPU 11*a* confirms whether or not the commodity code is acquired again (Act 6). Thus, the CPU 11*a* waits for the acquisition of the commodity code or the touch operation on the subtotal button as the processing in Act 6 and Act 7. Furthermore, in the waiting state, the CPU 11*a* may confirm generation of another event such as execution of another operation to carry out the processing corresponding to the generated event.

In the waiting states of Act 6 and Act 7, if the commodity code is acquired (Yes in Act 6), the CPU 11*a* returns to the processing in Act 4. Then, the CPU 11*a* repeats the processing following ACT 4 as being similar to that described above.

In the waiting states in Act 6 and Act 7, if the subtotal button is touched (Yes in Act 7), the CPU 11a generates the settlement information on the basis of the contents of the registration commodity table and the total table at this point of time (Act 8). Then, the CPU 11a displays a sending screen on a part of the screen of the touch panel 11g (Act 9).

The sending screen includes third and fourth display areas, a reduced price button, a discount button, a return button and a sending button. The third display area displays the total quantity and the total amount of the total table. The fourth display area displays various messages. The reduced price button and the discount button are used by the store clerk 21 to designate that a price reduction or a percent discount is applied to the total amount. The return button is used by the store clerk 21 to designate that a part of the area of the screen of the touch panel 11g returns to the registration screen. The sending button is used by the store clerk 21 to designate that the settlement information is sent to the settlement apparatus 12.

The CPU 11a confirms whether or not the return button is operated (Act 10). If the return button is not operated (No in Act 10), the CPU 11a confirms whether or not the sending button is operated (Act 11). If the sending button is not operated (No in Act 11), the CPU 11a confirms whether or not the return button is operated again (Act 10). Thus, the CPU 11a waits for the operation on the return button or sending button in the processing in Act 10 and Act 11. Furthermore, in the waiting state, the CPU 11a confirms generation of another event such as execution of another operation and proceeds to the processing corresponding to the generated event. For example, if either the discount button or the reduced price button is touched by the store clerk 21, the CPU 11a changes the total amount included in the settlement information according to a subsequent instruction by the store clerk 21.

In the waiting states of Act 10 and Act 11, if the return button is operated (Yes in Act 10), the CPU 11a returns a part of the area of the screen on the touch panel 11g to the registration screen (Act 12). After that, the CPU 11a proceeds to the processing in Act 6, and repeats the processing following ACT 6 as being similar to that described above.

In the waiting states of Act 10 and Act 11, if the sending button is operated (Yes in Act 11), the CPU 11a proceeds to the processing in Act 13 in FIG. 4. In other words, the CPU 11a acquires the sending destination ID set in the sending destination storage area of the RAM 11c (Act 13). Then, the CPU 11a sends the settlement information generated in the processing in Act 8 to one settlement apparatus 12 identified by the acquired sending destination ID (Act 14).

Specifically, the CPU 11a sets the communication address set in the one settlement apparatus 12 identified by the sending destination ID to the sending destination address, and sets the communication address set therein to a sending source address to control the communication unit 11j to send the settlement information via the LAN 13. With this operation, the settlement information is sent to the one settlement apparatus 12 identified by the sending destination ID via the LAN 13. In this manner, the sending destination ID is associated with the communication address set in the settlement apparatus 12. Alternately, the sending destination ID may be the communication address itself set in the settlement apparatus 12.

The settlement information sent via the LAN 13 is received by the settlement apparatus 12 having the communication address coincident with the sending destination address. The settlement apparatus 12 that receives the settlement information can specify the commodity registration apparatus 11 serving as the sending source of the settlement information by storing the sending source address of the settlement information.

After the settlement information is sent, the CPU 11a waits for a response signals from the settlement apparatus 12 (Act 15). As described later, in the settlement apparatus 12 that receives the settlement information, there may be a case of returning a reception response signal to the commodity registration apparatus 11 or a case of returning an error response signal thereto. If either of these response signals are received via the communication unit 11j (Yes in Act 15), the CPU 11a first confirms whether or not the received response signal is the reception response (Act 16). If the received response signal is the reception response (Yes in Act 16), the CPU 11a displays a guidance screen on a part of the screen on the touch panel 11g (Act 17).

The guidance screen enables the store clerk 21 to confirm the settlement apparatus 12 serving as the sending destination of the settlement information. The guidance screen includes a fifth display area and a close button. The fifth display area displays a message together with the total quantity and the total amount of the total table. The message, such as "Please settle at settlement apparatus B", for example, enables the store clerk 21 to recognize the settlement apparatus 12 which carries out a storage processing on the settlement information. The specific settlement apparatus 12 which carries out the storage processing on the settlement information is indicated in the reception response as described below. Content of the message is not particularly limited. For example, the content of the message may be "Sent to the settlement apparatus B", or simply "Settlement apparatus B" or "B". The close button is used by the store clerk 21 to designate close of the guidance screen. If the close button is operated, the CPU 11a closes the guidance screen to finish the information processing of one transaction. After that, the CPU 11a restarts the processing from Act 1.

On the other hand, if the response signal is the error response but not the reception response (No in Act 16), the CPU 11a executes a transmission disable processing (Act 18). The transmission disable processing is, for example, a processing for informing the store clerk 21 that the settlement information sent in the processing in Act 14 is not received by all the settlement apparatuses 12 which are arranged in the same checkout lane. Furthermore, for example, the transmission disable processing includes notification to the store clerk 21 that the settlement processing on the settlement information is carried out using the commodity registration apparatus 11 and the settlement processing is executed. The transmission disable processing is not limited to the operation for executing the settlement processing using the commodity registration apparatus 11. For example, the settlement apparatus shared by all the checkout lanes is arranged at the service counter of the store in advance, and the settlement information that cannot be sent to this settlement apparatus may be sent via the LAN 13.

If the transmission disable processing is ended, the CPU 11a terminates the information processing on one transaction. After that, the CPU 11a restarts the processing from Act 1.

If the reception response signal is received from the settlement apparatus 12, the store clerk 21 who confirms the guidance screen displayed on the touch panel 11g notifies the customer 22 of a message indicating that the settlement can be carried out with the settlement apparatus 12 which is indicated in the guidance screen. The customer 22 who receives the notification moves to the indicated settlement apparatus 12, and carries out the operation for settlement.

Next, the operations of the settlement apparatus 12 are described.

If the settlement apparatus 12 is activated, the CPU 12a starts the main processing indicated by the procedures shown in the flowchart in FIG. 5. Firstly, the CPU 12a initializes a processing flag F to "0" (Act 21).

The CPU 12a displays the screen of the touch panel 12g as a standby screen (Act 22). The standby screen indicates that the settlement apparatus 12 is in a state in which the settlement processing cannot be carried out, but information displayed may be selectable. For example, it is assumed that the standby screen displays a message indicating that the settlement processing cannot be carried out or any image indicating an advertisement as a screen saver.

On the other hand, the CPU 12a which starts the main processing is executable with respect to performing the reception interruption processing shown in FIG. 6 in parallel with this main processing. If information whose sending destination address is set in the communication unit 12j as the communication address is received by the communication unit 12j, the CPU 12a starts the reception interruption processing.

If the reception interruption processing is started, the CPU 12a confirms whether or not the received information is the settlement information (Act 41). In the received information, a category code indicating category of the information is included. The CPU 12a identifies whether or not the received information is the settlement information according to the category code. If the received information is information other than the settlement information (No in Act 41), the CPU 12a executes the information processing corresponding to the category of the received information.

If the received information is the settlement information (Yes in Act 41), the CPU 12a confirms whether or not the processing flag F is set to "1" (Act 42). If the processing flag F is reset to "0" (No in Act 42), in other words, in a case in which the settlement processing is not executed by the settlement apparatus 12, the CPU 12a confirms whether or not a timer described later is operating (Act 43). If the timer is not operated (No in Act 43), the CPU 12a notifies the main processing of the reception of the settlement information (Act 44).

On the other hand, if the processing flag F is set to "1" (Yes in Act 42), or if the timer is operating (Yes in Act 43), the CPU 12a confirms whether or not the transfer destination ID is stored in the transfer destination storage area (Act 45). If the transfer destination ID is not stored in the transfer destination storage area (No in Act 45), the CPU 12a sends the error response signal to the commodity registration apparatus 11 identified by the return destination ID stored in the return destination storage area (Act 46). In other words, the CPU 12a sends the error response signal to the commodity registration apparatus 11 arranged in the same checkout lane. Specifically, the CPU 12a sets the communication address set in the corresponding commodity registration apparatus 11 to the sending destination address and sets the communication address to the sending source address, and controls the communication unit 12j to send the error response signal to the LAN 13. In this way, the error response signal is sent to the corresponding commodity registration apparatus 11 via the LAN 13.

On the other hand, if the transfer destination ID is stored in the transfer destination storage area (Yes in Act 45), the CPU 12a acquires the transfer destination ID from the transfer destination storage area (Act 47). Then, the CPU 12a transfers the settlement information to another settlement apparatus 12 identified by the transfer destination ID (Act 48).

Specifically, the CPU 12a controls the communication unit 12j to send the settlement information over the LAN 13 without any change. However, the CPU 12a sets the communication address set in one settlement apparatus 12 identified by the transfer destination ID to the sending destination address, and sets the its own communication address as the sending source address. In this way, the settlement information is sent to one settlement apparatus 12 identified by the transfer destination ID via the LAN 13. In this manner, the transfer destination ID is associated with the communication address set in the settlement apparatus 12. Alternately, the transfer destination ID may be the communication address set in the settlement apparatus 12.

Furthermore, in the sending destination storage area of the commodity registration apparatus 11 and the transfer destination storage area of each of the plurality of the settlement apparatuses 12, the transfer destination IDs are determined in such a manner that the settlement information is sequentially transferred to the plurality of the settlement apparatuses 12 arranged in the same checkout lane. Specifically, for example, the commodity registration apparatus 11 and the three settlement apparatuses 12 arranged in the checkout lane at the upper side shown in FIG. 1 are respectively referred to as the commodity registration apparatus 11-1 and the settlement apparatuses 12-1, 12-2 and 12-3. In this case, the ID of the settlement apparatus 12-1 is stored in the sending destination storage area of the commodity registration apparatus 11-1 as the sending destination ID. Then, for example, the ID of the settlement apparatus 12-2 and the ID of the settlement apparatus 12-3 are stored respectively in the transfer destination storage area of the settlement apparatus 12-1 and in the transfer destination storage area of the settlement apparatus 12-2 as the sending destination IDs. At this time, no sending destination ID is stored in the transfer destination storage area of the settlement apparatus 12-3. The ID of the commodity registration apparatus 11-1 is stored in the return destination storage area of the settlement apparatus 12-3 as the return destination ID.

Description returns to the description in FIG. 5. The CPU 12a that terminates the processing in Act 21 and Act 22 waits for the reception of the settlement information (Act 23). Then, if the settlement information by the reception interruption processing in Act 44 is received (Yes in Act 23), the CPU 12a stores the settlement information received by the communication unit 12j (Act 24). Further, the CPU 12a sets the processing flag F to "1" (Act 25).

The CPU 12a finishes the processing in Act 24 and Act 25 and sends the reception response signal to the commodity registration apparatus 11 arranged at the same checkout lane (Act 26).

Specifically, the CPU 12a sets the communication address set in the corresponding commodity registration apparatus 11 to the sending destination address, and the communication address set in itself to the sending source address, and controls the communication unit 12j to send the reception response signal to the LAN 13. In this way, the reception response signal is sent to the corresponding commodity registration apparatus 11 via the LAN 13.

After that, the CPU 12a displays a settlement screen on a part of the screen of the touch panel 12g (Act 27). The settlement screen includes sixth and seventh display areas, a cash button, an electronic money button and a call button. The sixth display area displays an operation guidance to the customer 22 who operates the settlement apparatus 12. The seventh display area displays the total quantity and the total amount included in the settlement information stored in the settlement buffer. The cash button is used by the customer 22 to designate that a payment method is a cash payment. The electronic money button is used by the customer 22 to designate that the payment method is an electronic money payment. The call button is used by the customer 22 to designate call of the store clerk 21.

The customer 22 who confirms the settlement screen determines the payment method, i.e., cash or electronic money. In a case of paying with cash, the customer 22 touches the cash button and deposits cash of the total amount or more to the automatic change machine 12e. On the other hand, in a case of paying with electronic money, the customer 22 touches the electronic money button and reads the data of the electronic money card with the card reader/writer 12i.

The CPU 12a waits for the touch on the cash button or the electronic money button (Act 28). If the cash button or the electronic money button is touched, the CPU 12a executes the settlement processing according to the payment method selected by the touched button (Act 29). If the cash button is touched, the CPU 12a executes the settlement processing for the cash payment. If the electronic money button is touched, the CPU 12a executes the settlement processing for the electronic money payment. Since the settlement processing for the cash payment or for the electronic money payment is well-known in the existing self-checkout POS terminal, the description thereof is omitted.

The settlement method is not limited to the cash or the electronic money. For example, the settlement apparatus 12 can treat other settlement methods such as a credit card, a cash voucher such as a gift voucher and the like.

If the settlement processing is ended, the CPU 12a executes a receipt issuing processing (Act 30). In other words, the CPU 12a edits print data of a receipt on the basis of the settlement information stored in the settlement buffer. Then, the CPU 12a enables the printer 12h to operate to issue the receipt.

If the issuance of the receipt is completed, the CPU 12a activates the timer (Act 31). Once the timer is activated, the timer continuously operates for a period in which counting of a predetermined standby time is finished. The timer can be realized as, for example, a software timer with processing in another task or job by the CPU 12a. Alternatively, a device for carrying out the foregoing counting operation may be added. The standby time may be fixedly determined by a designer of the settlement apparatus 12, or may be optionally changed according to an instruction by a user. In a case of changing the standby time according to the instruction by the user, the CPU 12a, for example, stores information indicating the standby time in the auxiliary storage unit 12d if determining the standby time according to the instruction by the user. Then, the CPU 12a controls the foregoing timer to count the standby time indicated by the stored information. Even if the standby time can be changed optionally according to the instruction by the user, it may be arranged that the standby time is selected from default values determined in advance. The standby time is determined to be a sufficient time, for example, 20 seconds, for the customer 22 who completes the settlement to leave the settlement apparatus 12. Afterward, the CPU 12a returns to the processing in Act 4. Then, CPU 12a repeats the processing following ACT 4 as being similar to that described above.

In this way, the timer maintains an operation state until the predetermined standby time elapses from the completion of the settlement processing. Thus, according to the processing of the CPU 12a in the reception interruption processing described above, the settlement apparatus 12 does not start a new settlement processing until the predetermined standby time elapses from the completion of the settlement processing.

As described above, in the checkout system 10 of the present embodiment, if the registration job of the purchased commodity by the store clerk 21 is ended on the commodity registration apparatus 11, the store clerk 21 touches the sending button of the sending screen. Then, the settlement information including the sales data of the purchased commodity is sent to one settlement apparatus 12 identified by the sending ID set in the sending destination storage area among the plurality of the settlement apparatuses 12 arranged at the same checkout lane at which the commodity registration apparatus 11 is arranged. Then, depending on the states of the plurality of the settlement apparatuses 12 arranged at the same checkout lane, the settlement information is sequentially transferred among the settlement apparatuses 12, and the settlement information is finally received by an available one of the settlement apparatuses 12.

In other words, in a case in which the IDs are stored, as stated above, in the sending destination storage areas, the transfer destination storage areas and the return destination storage areas of the commodity registration apparatus 11-1 and the settlement apparatuses 12-1, 12-2 and 12-3 arranged at the checkout lane at the upper side shown in FIG. 1, the settlement information is treated as follows.

First, no matter what each state of the settlement apparatuses 12-1, 12-2 and 12-3 is, the settlement information is sent from the commodity registration apparatus 11-1 to the settlement apparatus 12-1.

In the settlement apparatus 12-1, if the settlement processing is not executed, and the standby time already elapses after the last time settlement processing is finished, the processing flag F is reset to "0", and the timer does not operate. At this time, the settlement information is stored in the settlement buffer of the settlement apparatus 12-1. Further, the reception response signal is sent from the settlement apparatus 12-1 to the commodity registration apparatus 11-1. As a result, the guidance screen for indicating that the sending destination of the settlement information is the settlement apparatus 12-1 is displayed on the touch panel 11g of the commodity registration apparatus 11-1. Thus, the store clerk 21 tells the customer 22 to carry out the settlement by the settlement apparatus 12-1.

The customer 22 goes to the settlement apparatus 12-1. At this time, the settlement screen is displayed on the touch panel 12g of the settlement apparatus 12-1, and thus the customer 22 carries out the settlement with cash, electronic money or the like.

On the other hand, in the settlement apparatus 12-1, in a case in which the settlement processing is being executed, or the standby time does not elapse after the last time settlement processing is ended although the settlement processing is not executed, the processing flag F is set to "1", or the timer is in the operation state. At this time, the transfer destination ID for identifying the settlement apparatus 12-2 is stored in the transfer destination storage area of the settlement apparatus 12-1, and thus, the settlement information sent from the commodity registration apparatus 11 to the settlement apparatus 12-1 is transferred from the settlement apparatus 12-1 to the settlement apparatus 12-2 via the LAN 13.

In the settlement apparatus 12-2, the settlement information transferred from the settlement apparatus 12-1 is stored in the settlement buffer of the settlement apparatus 12-2 or is transferred to the settlement apparatus 12-3, as the same as the case of the settlement apparatus 12-1. Ina case in which the settlement information is stored in the settlement buffer of the settlement apparatus 12-2, the reception response signal is sent from the settlement apparatus 12-2 to the commodity registration apparatus 11-1. As a result, the guidance screen for indicating that the sending destination of the settlement information is the settlement apparatus 12-2 is displayed on the touch panel 11g of the commodity registration apparatus 11-1. Thus, the store clerk 21 tells the customer 22 to execute the settlement on the settlement apparatus 12-2.

In the settlement apparatus 12-3, if the settlement processing is not executed and the standby time already elapses after the last time settlement processing is ended, the settlement information is stored in the settlement buffer of the settlement apparatus 12-3. Further, the reception response signal is sent from the settlement apparatus 12-3 to the commodity registration apparatus 11-1. As a result, the guidance screen for indicating that the sending destination of the settlement information is the settlement apparatus 12-3 is displayed on the touch panel 11g of the commodity registration apparatus 11-1. Thus, the store clerk 21 tells the customer 22 to execute the settlement on the settlement apparatus 12-3.

On the other hand, in the settlement apparatus 12-3, in a case in which the settlement processing is being executed, or the standby time does not elapse after the last time settlement processing is ended although the settlement processing is not executed, the error response signal is sent from the settlement apparatus 12-3 to the commodity registration apparatus 11-1. As a result, in the commodity registration apparatus 11-1, the transmission disable processing is executed. According to the transmission disable processing, for example, the store clerk 21 operates the commodity registration apparatus 11-1 to process the settlement of the customer 22, instead of the settlement apparatus 12.

As described above, according to the checkout system 10 of the first embodiment described above, the settlement information is received by the settlement apparatus 12 capable of receiving the settlement information while the settlement information is sequentially transferred to the plurality of the settlement apparatuses 12. In such an operation, the settlement apparatus 12 does not receive new settlement information for a period for which not only the settlement processing is being executed but also the standby time elapses after the settlement processing is ended. Thus, it reduces a situation in which the settlement information relating to the transaction of another customer 22 is received by the settlement apparatus 12 even when the customer 22 who completes the settlement still stands in front of the settlement apparatus 12 occurs. As a result, it can reduce confusion caused to the customer 22.

Second Embodiment

Figure 7:
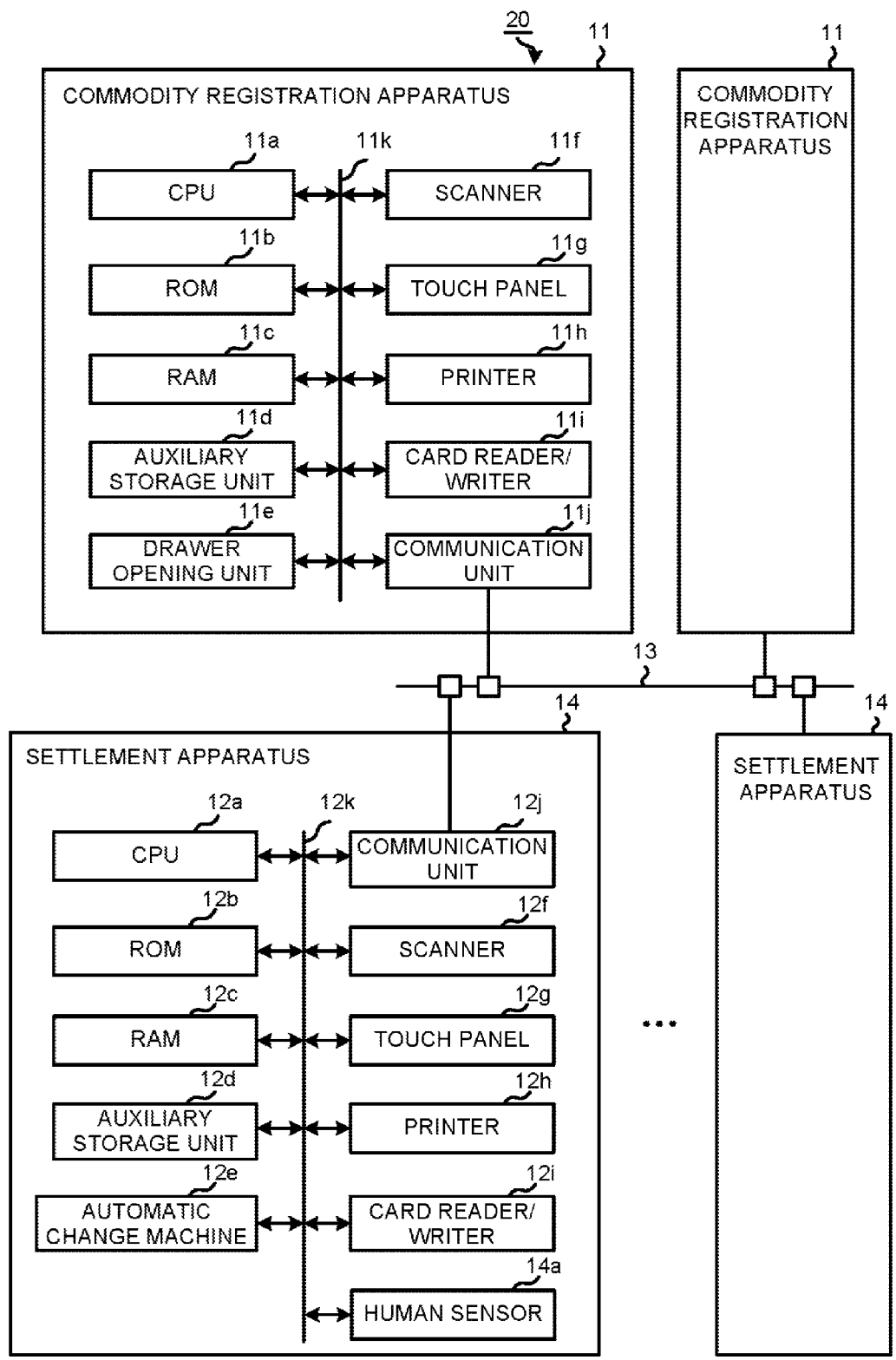
FIG. 7 is a block diagram illustrating the main portion of a checkout system according to a second embodiment.

FIG. 7 is a block diagram illustrating the circuit arrangement of main portion of a checkout system 20 according to the second embodiment. In FIG. 7, the same reference numerals are applied to the same elements as FIG. 2, and thus the detailed descriptions thereof are omitted.

The checkout system 20 includes a plurality of commodity registration apparatuses 11 and settlement apparatuses 14 of which the number is more than that of the commodity registration apparatuses 11. In other words, the checkout system 20 includes the settlement apparatus 14 instead of the settlement apparatus 12 in the checkout system 10. The arrangement of the settlement apparatus 14 is similar to that of the settlement apparatus 12.

The settlement apparatus 14 includes the CPU 12a, the ROM 12b, the RAM 12c, the auxiliary storage unit 12d, the automatic change machine 12e, the scanner 12f, the touch panel 12g, the printer 12h, the card reader/writer 12i, the communication unit 12j, the transmission system 12k and a human sensor 14a. In other words, the settlement apparatus 14 includes the human sensor 14a added to the settlement apparatus 12.

The human sensor 14a detects the presence of a person located in front of the settlement apparatus 14. A well-known sensor such as an infrared sensor can be used as the human sensor 14a.

Hereinafter, the operations of the checkout system 20 are described. Contents of the processing described below are one example, and various processing capable of achieving the same result can be suitably adopted.

In the operations of the checkout system 20, the difference from the operations in the checkout system 10 is a part of the processing executed by the CPU 12a according to the control program.

The CPU 12a in the checkout system 20 does not carry out the processing in Act 31 in the main processing shown in FIG. 5. In other words, the CPU 12a in the checkout system 20 carries out the processing in Act 21-Act 30 shown in FIG. 5 in the same way as the first embodiment. Then, the CPU 12a in the checkout system 20 returns to the processing in Act 21 if the issuance of the receipt is completed in the processing in Act 31.

Figure 8:
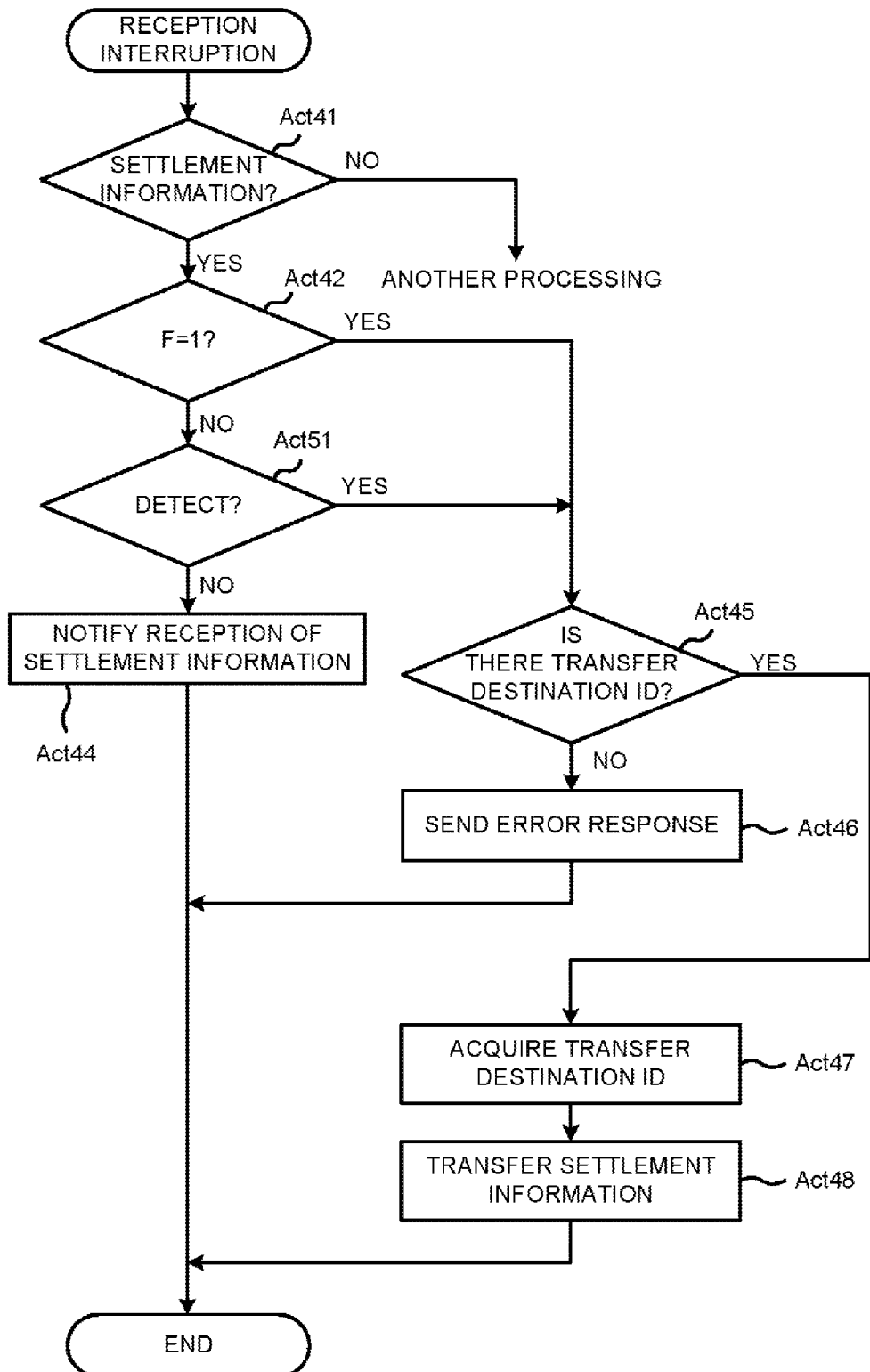
FIG. 8 is a flowchart illustrating an example sequence of operations of a reception interruption processing executed by a CPU of a settlement apparatus according to the second embodiment.

FIG. 8 is a flowchart illustrating main procedures of the reception interruption processing executed by the CPU 12a according to the second embodiment. In FIG. 8, the same reference numerals are applied to the same processing as that shown in FIG. 6, and thus the detailed descriptions thereof are omitted.

If the reception interruption processing is started, the CPU 12a of the checkout system 20 carries out the same processing as the first embodiment in Act 41 and Act 42. Then, if the processing flag is reset to "0" (No in Act 42), the CPU 12a of the checkout system 20 confirms whether or not a person is detected by the human sensor 14a (Act 51). If the person is not detected (No in Act 51), the CPU 12a proceeds to the processing in Act 44 and carries out the same processing following ACT 44 as the first embodiment.

On the other hand, if the processing flag is set to "1" (Yes in Act 42), or if the person is detected (Yes in Act 51), the CPU 12a proceeds to the processing in Act 45 and carries out the same processing following ACT 45 as the first embodiment.

In this way, according to the checkout system 20, the settlement information is received by the settlement apparatus 14 capable of receiving the settlement information while the settlement information is sequentially transferred to the plurality of the settlement apparatuses 14. In such an operation, the settlement apparatus 14 does not receive new settlement information in a case in which the settlement processing is being executed and also in a case in which a person who stands in front of the settlement apparatus 14 is detected even if the settlement processing is not executed. Thus, it reduces a situation that the settlement information is received by the settlement apparatus 14 when another customer 22 different from the customer 22 corresponding to the transaction stands in front of the settlement apparatus 14 occurs. As a result, it can reduce confusion caused to the customer 22.

The present invention is not limited to each embodiment described above. The condition and the route under which the settlement information is sent to one of a plurality of settlement apparatuses are not limited to the embodiments described above. For example, the following various cases are assumed:

(1) If the store clerk designates one of the settlement apparatuses on the commodity registration apparatus, the commodity registration apparatus sends the settlement information to the designated settlement apparatus.

(2) The plurality of the settlement apparatuses sequentially transfer the settlement information as with the first and second embodiments in the order shown in the list stored in each of the settlement apparatuses or in the order shown in the list appended to the settlement information.

(3) The commodity registration apparatus monitors the execution statuses of the settlement processing in the plurality of the settlement apparatuses arranged in the same checkout lane. Then, the commodity registration apparatus determines one of the settlement apparatuses which does not execute the settlement processing, and automatically or in response to the instruction by the store clerk sends the settlement information to the determined settlement apparatus.

(4) The commodity registration apparatus monitors the execution statuses of the settlement processing in the plurality of the settlement apparatuses arranged in the same checkout lane, and the elapsed time after the end of the settlement processing or the detection result of the human sensor 14a. Then, the commodity registration apparatus determines one of the settlement apparatuses for which the condition of receiving the settlement information is established in the first or second embodiment, automatically or in response to the instruction by the store clerk to send the settlement information to the determined settlement apparatus.

Furthermore, in the foregoing cases (1)~(3), the settlement apparatus to which the settlement information is sent determines whether or not the settlement information is received according to the same processing as in the first or second embodiment. In the case of foregoing (4), the settlement apparatus is not required to execute the determination of reception performed in consideration of the execution status of the settlement processing and the elapsed time after the end of the settlement processing or the detection result of the human sensor 14a.

The transfer destination storage area of each settlement apparatus 12 (14) in which the transfer destination ID is stored therein may also store therein ID for identifying each settlement apparatus 12 (14) arranged at, for example, the adjacent checkout lane. With the above, even if all the settlement apparatuses 12 (14) arranged in the same lane execute the settlement processing, the customer can carry out settlement with the settlement apparatus 12 (14) if at least one settlement apparatus 12 (14) arranged at the adjacent checkout lane is in the standby state.

The sending destination ID stored in the sending destination storage area of the commodity registration apparatus 11 may be stored in the transfer destination storage area of the settlement apparatus 12 to which the settlement information is transferred finally. With the above, even if all the settlement apparatuses 12 arranged at the same lane execute settlement processing temporarily, the store clerk can tell the customer that settlement can be executed on the settlement apparatus 12 at the time another customer finishes settlement on the same settlement apparatus.

The return destination storage area is not formed in the RAM 12c, but the ID for identifying the commodity registration apparatus 11 may be stored in the transfer destination storage area of the settlement apparatus 12 (14) to which the settlement information is transferred finally.

In the embodiments described above, the purchase of the commodity is described as a transaction; however, the transaction may not be accompanied with the purchase of the commodity. For example, the checkout system of the present invention can also be applied to a transaction on which fee for service rendering such as charge for use of facilities, fee for rental articles and the like is incurred. In other words, "commodity" is not limited to tangible article, and may be service. Thus, "purchased commodity" includes service provided for a fee to a beneficiary recipient from a provider.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A checkout system comprising:
a plurality of settlement apparatuses, each configured to transmit and receive settlement information, and to perform settlement processing with respect to the received settlement information; and
a registration apparatus including a scanner, a storage unit, a communication, and a processor configured to control the scanner, the storage unit and the communication interface to
identify a commodity corresponding to a code scanned by the scanner,
generate the settlement information for settling a transaction for one or more identified commodities, and
transmit the settlement information to a selected one of the plurality of settlement apparatuses, wherein
when the selected one of the plurality of settlement apparatuses receives the settlement information, the selected one of the plurality of settlement apparatuses determines, with respect to itself, whether a settlement processing is currently being performed and whether a settlement processing was completed within a preceding predetermined amount of time, and
based on the determination, the selected one of the plurality of settlement apparatuses performs one of the settlement processing with respect to the received settlement information, and transmission of the settlement information to another one of the plurality of settlement apparatuses.

2. The system according to claim 1, wherein
when the selected one of the plurality of settlement apparatuses determines, with respect to itself, that a settlement processing is not currently being performed and that no settlement processing was completed within a preceding predetermined amount of time, the selected one of the plurality of settlement apparatuses performs the settlement processing with respect to the received settlement information.

3. The system according to claim 2, wherein
when the selected one of the plurality of settlement apparatuses determines, with respect to itself, that a settlement processing is not currently being performed and that no settlement processing was completed within a preceding predetermined amount of time, the selected one of the plurality of settlement apparatuses transmits a settlement processing confirmation to the registration apparatus.

4. The system according to claim 3, wherein
the registration unit further includes a display, and
when the registration apparatus receives the settlement processing confirmation, the processor controls the display to display a guidance screen indicating the selected one of the plurality of settlement apparatuses as a destination for a customer to complete the settlement processing.

5. The system according to claim 1, wherein
when the selected one of the plurality of settlement apparatuses determines, with respect to itself, that a settlement processing is currently being performed or that a settlement processing was completed within a preceding predetermined amount of time, the selected one of the plurality of settlement apparatuses transmits the settlement information to another one of the plurality of settlement apparatuses.

6. The system according to claim 5, wherein
when each of the plurality of settlement apparatuses determines, with respect to itself, that a settlement processing is currently being performed or that a settlement processing was completed within a preceding predetermined amount of time, the registration apparatus performs the settlement processing with respect to the transmitted settlement information.

7. The system according to claim 1, wherein the predetermined amount of time can be changed by a user in advance.

8. A settlement apparatus for use in a checkout system comprising a plurality of settlement apparatuses and a registration apparatus, the settlement apparatus comprising:
a communication interface,
a storage unit, and
a processor configured to control the communication interface and the storage unit to
in response to settlement information received from the registration apparatus, determine, with respect to itself, whether a settlement processing is currently being performed and whether a settlement processing was completed within a preceding predetermined amount of time, and based on the determination, perform one of the settlement processing with respect to the received settlement information or transmission of the settlement information to another one of the plurality of settlement apparatuses of the checkout system.

9. The apparatus according to claim 8, wherein
when the processor determines that a settlement processing is not currently being performed and that no settlement processing was completed within a preceding predetermined amount of time, the processor performs the settlement processing with respect to the received settlement information.

10. The apparatus according to claim 9, wherein
when the processor determines that a settlement processing is not currently being performed and that no settlement processing was completed within a preceding predetermined amount of time, the processor controls the communication interface to transmit a settlement processing confirmation to the registration apparatus.

11. The apparatus according to claim 8, wherein
when the processor determines that a settlement processing is currently being performed or that a settlement processing was completed within a preceding predetermined amount of time, the processor controls the communication interface to transmit the settlement information to another one of the plurality of settlement apparatuses of the checkout system.

12. The apparatus according to claim 8, wherein the predetermined amount of time can be changed by a user in advance.

13. A method for executing settlement processing in a in a checkout system comprising a plurality of settlement apparatuses and a registration apparatus, the method comprising the steps of:
scanning a code on a commodity;
identifying the commodity based on the scanned code;
generating settlement information for settling a transaction for one or more identified commodities;
transmitting the settlement information from the registration apparatus to a selected one of the plurality of settlement apparatuses;
determining whether the selected one of the plurality of settlement apparatuses is available for performing settlement processing with respect to the transmitted settlement information; and
based on the determination, performing one of the settlement processing with respect to the received settlement information with the selected one of the plurality of settlement apparatuses, and transmission of the settlement information from the selected one of the plurality of settlement apparatuses to another one of the plurality of settlement apparatuses.

14. The method according to claim 13, wherein the determination is based on whether, with respect to the selected settlement apparatus, a settlement processing is currently being performed and whether a settlement processing was completed within a preceding predetermined amount of time.

15. The method according to claim 14, wherein the predetermined amount of time can be changed by a user in advance.

16. The method according to claim 13, further comprising the step of:
sensing, with a sensor, whether a person is positioned near the selected one of the plurality of settlement apparatuses,
wherein the determination is based on whether, with respect to the selected settlement apparatus, a settlement processing is currently being performed and whether the sensor senses a person positioned near the selected one of the plurality of settlement apparatuses.

17. The method according to claim 13, further comprising the step of:
when the selected one of the plurality of settlement apparatuses is determined to be available for performing settlement processing with respect to the transmitted settlement information, transmitting a settlement processing confirmation from the selected one of the plurality of settlement apparatuses to the registration apparatus.

18. The method according to claim 17, further comprising the step of:

displaying, on a display, a guidance screen indicating the selected one of the plurality of settlement apparatuses as a destination for a customer to complete the settlement processing.

19. The method according to claim 13, further comprising the steps of:

when the selected one of the plurality of settlement apparatuses is determined to not be available for performing settlement processing with respect to the transmitted settlement information, determining whether any other of the plurality of settlement apparatuses are available for performing settlement processing with respect to the transmitted settlement information; and when none of the other of the plurality of settlement apparatuses are available for performing settlement processing with respect to the transmitted settlement information, performing the settlement processing with respect to the received settlement information with the registration apparatus.

20. The method according to claim 13, wherein the settlement information is transmitted from the registration apparatus to the selected one of the plurality of settlement apparatuses after the selected one of the plurality of settlement apparatuses is determined to be available for performing the settlement processing with respect to the settlement information.

\* \* \* \* \*